US012333352B2

(12) United States Patent
Haden et al.

(10) Patent No.: US 12,333,352 B2
(45) Date of Patent: Jun. 17, 2025

(54) BROWSER EVENT SYNCHRONIZATION MANAGEMENT IN A FEDERATED SYSTEM

(71) Applicants: ATLASSIAN PTY LTD., Sydney (AU); ATLASSIAN US, INC., San Francisco, CA (US)

(72) Inventors: David Haden, Sydney (AU); Saidur Rahman, Sydney (AU)

(73) Assignees: ATLASSIAN PTY, LTD., Sydney (AU); ATLASSIAN US, INC., San Francisco, CA (US)

(*) Notice: Subject to any disclaimer, the term of this patent is extended or adjusted under 35 U.S.C. 154(b) by 507 days.

(21) Appl. No.: 17/710,272

(22) Filed: Mar. 31, 2022

(65) Prior Publication Data

US 2023/0315540 A1    Oct. 5, 2023

(51) Int. Cl.
*G06F 9/46*     (2006.01)
*G06F 9/52*     (2006.01)
*G06F 9/54*     (2006.01)
*G06F 16/25*    (2019.01)
*G06F 16/28*    (2019.01)

(52) U.S. Cl.
CPC .............. *G06F 9/52* (2013.01); *G06F 9/542* (2013.01); *G06F 16/256* (2019.01); *G06F 16/289* (2019.01)

(58) Field of Classification Search
CPC ........................................................ G06F 9/52
USPC ........................................................ 718/106
See application file for complete search history.

(56) References Cited

U.S. PATENT DOCUMENTS

| 2004/0068340 A1* | 4/2004 | Mayberry | G06F 11/3409 714/E11.192 |
| 2005/0028171 A1* | 2/2005 | Kougiouris | G06F 11/0715 719/318 |
| 2006/0140202 A1* | 6/2006 | Garg | H04L 49/9031 370/412 |
| 2011/0239138 A1* | 9/2011 | Galushka | H04L 67/535 715/760 |
| 2012/0084133 A1* | 4/2012 | Ross | G06Q 30/0226 709/224 |
| 2013/0074083 A1* | 3/2013 | Oliver | G06F 16/27 719/318 |
| 2014/0019589 A1* | 1/2014 | Ross | G06F 11/3476 709/217 |

(Continued)

OTHER PUBLICATIONS

Indexed Database API 3.0, Editor's Draft, Oct. 6, 2021, https://w3c.github.io/IndexedDB/, [retrieved from Internet Jun. 8, 2022] 126 pages.

(Continued)

*Primary Examiner* — Mehran Kamran
(74) *Attorney, Agent, or Firm* — Alston & Bird LLP

(57) ABSTRACT

Various embodiments of the present invention provide methods, apparatuses, systems, computing devices, and/or the like that are configured to enable effective and efficient browser event synchronization management in a federated system. For example, certain embodiments of the present invention provide methods, apparatuses, systems, computing devices, and/or the like that are configured to manage browser event synchronization using techniques that utilize object-oriented event management database stored at client computing device and asynchronous browser event processing.

18 Claims, 8 Drawing Sheets

(56) References Cited

U.S. PATENT DOCUMENTS

| | | | |
|---|---|---|---|
| 2015/0347616 A1* | 12/2015 | Levi | G06F 16/9535 |
| | | | 715/234 |
| 2017/0300966 A1* | 10/2017 | Dereszynski | G06F 9/45504 |
| 2018/0124082 A1* | 5/2018 | Siadati | H04L 63/1425 |
| 2018/0322216 A1* | 11/2018 | Vaidya | G06F 8/38 |
| 2020/0150943 A1* | 5/2020 | Singh | G06F 9/54 |
| 2020/0204612 A1* | 6/2020 | Tan | H04L 67/10 |
| 2021/0397499 A1* | 12/2021 | Pronk | G06F 11/079 |
| 2023/0123509 A1* | 4/2023 | Wolf | G06F 21/577 |
| | | | 714/45 |
| 2023/0315540 A1* | 10/2023 | Haden | G06F 9/548 |
| 2024/0015173 A1* | 1/2024 | Putnam | G06Q 30/0225 |

OTHER PUBLICATIONS

MDN Plus—IndexedDB API, https://developer.mozilla.org/en-US/docs/Web/API/IndexedDB_API, [retrieved from Internet Jun. 8, 2022] 5 pages.

* cited by examiner

BROWSER EVENT SYNCHRONIZATION MANAGEMENT IN A FEDERATED SYSTEM

BACKGROUND

Various methods, apparatuses, and systems are configured to provide techniques for browser event synchronization management. Applicant has identified many deficiencies and problems associated with existing methods, apparatuses, and systems for browser event synchronization management. Through applied effort, ingenuity, and innovation, these identified deficiencies and problems have been solved by developing solutions that are in accordance with the embodiments of the present disclosure, many examples of which are described in detail herein.

BRIEF SUMMARY

Embodiments are directed to browser event management across a plurality of browser tabs. In example embodiments, an object-oriented event management database associated with one or more browser tabs of the plurality of browser tabs is created on a client device. Each browser tab is configured for accessing one or more software applications, and each software application of the one or more software applications is associated with an origin of a plurality of origins. A browser event associated with a browser tab of the plurality of browser tabs is identified. Event data object corresponding to the browser event is stored within the object-oriented event management database associated with an origin associated with the browser tab. The object-oriented event management database is configured to store one or more stored event data objects corresponding to one or more unprocessed browser events. A stored event data object processing routine is performed using one or more event management execution threads that are executed asynchronously relative to a primary execution thread.

In embodiments, an origin is defined by one or more of a protocol, a domain, or a port. Event data objects associated with two or more browser tabs having a common origin are stored in a common object-oriented event management database. The event data object is stored on the object-oriented event management database using the one or more event management execution threads.

In embodiments, performing the stored event data object processing routine for a particular stored event data object of the one or more stored event data objects comprises retrieving the particular stored event data object, transmitting event data corresponding to the particular stored event data object to a server computing device associated with the unprocessed browser event for the particular stored event data object, and removing the particular stored event data object from the object-oriented event management database.

In embodiments, removing the particular stored event data object from the object-oriented event management database eliminates a duplicate transmission of the event data corresponding to the particular stored event data object to the server computing device by a browser tab configured to transmit event data corresponding to the particular stored event data object to the server computing device.

In embodiments, the stored event data objects are retrieved in accordance with a retrieval scheduling policy associated with the object-oriented event management database.

In embodiments, storing the event data object comprises identifying a service identifier associated with the browser event, determining a namespace counter associated with the service identifier, where the namespace counter describes a count of a subset of the one or more stored event data objects that are associated with the service identifier, and determining whether the namespace counter satisfies a namespace capacity threshold. In response to determining that the namespace counter fails to satisfy the namespace capacity threshold, an oldest stored event data object is removed from the object-oriented event management database based at least in part on a timestamp associated with each stored event data object of one or more stored event data objects.

In embodiments, storing the event data object comprises identifying a service identifier associated with the browser event, determining a namespace counter associated with the service identifier, where the namespace counter describes a count of a subset of the one or more stored event data objects that are associated with the service identifier, and determining whether the namespace counter satisfies a namespace capacity threshold. In response to determining that the namespace counter satisfies the namespace capacity threshold, the event data object is stored within the object-oriented event management database.

In embodiments, the object-oriented event management database stores each stored event data object in association with an event key.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below and embodied by the claims appended herein.

BRIEF DESCRIPTION OF THE DRAWINGS

Figure 1:
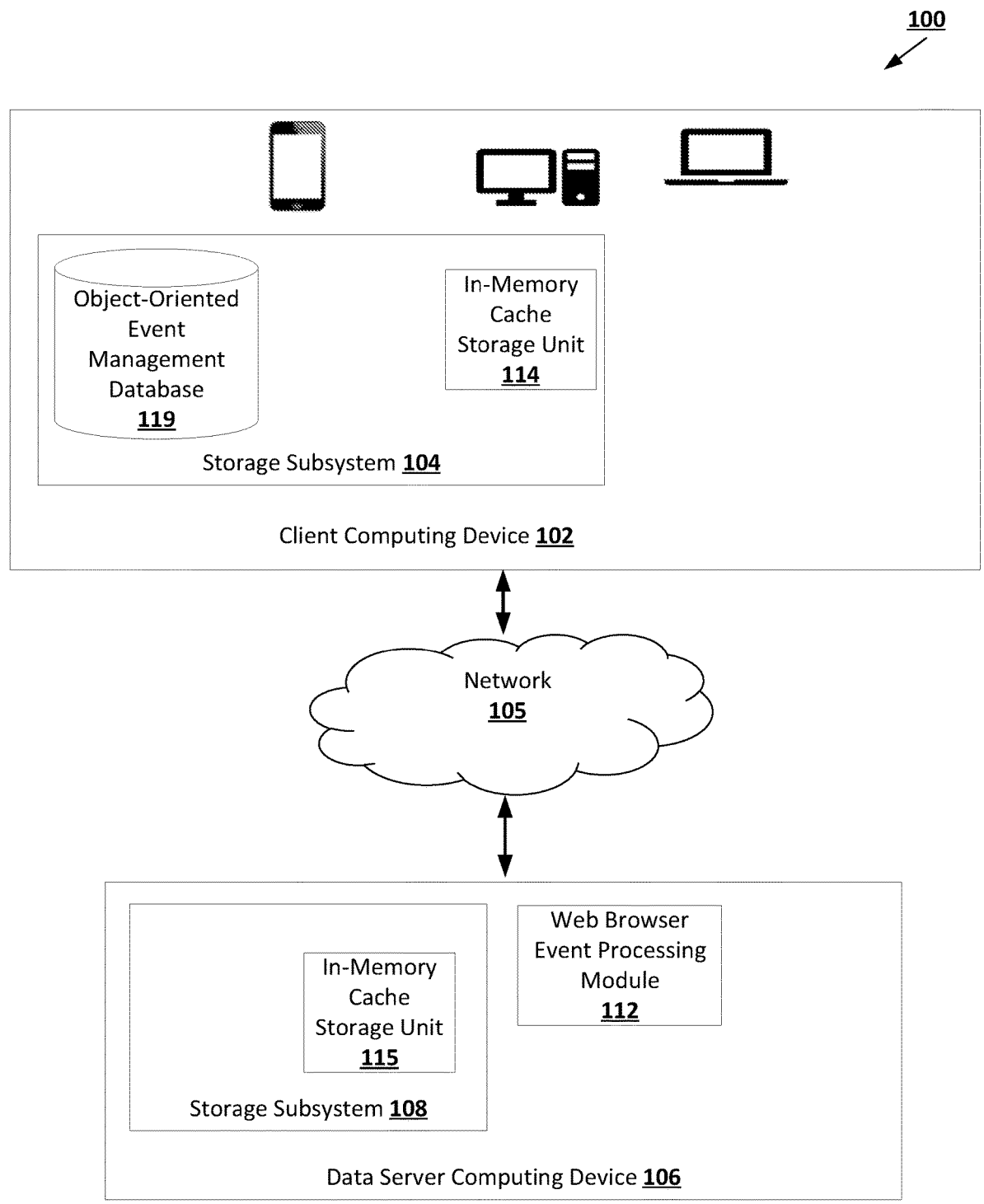

Having thus described some embodiments in general terms, references will now be made to the accompanying drawings, which are not necessarily drawn to scale, and wherein:

FIG. 1 is depicts an example architecture of an exemplary browser event synchronization management system within which one or more embodiments of the present disclosure may operate.

Figure 2:
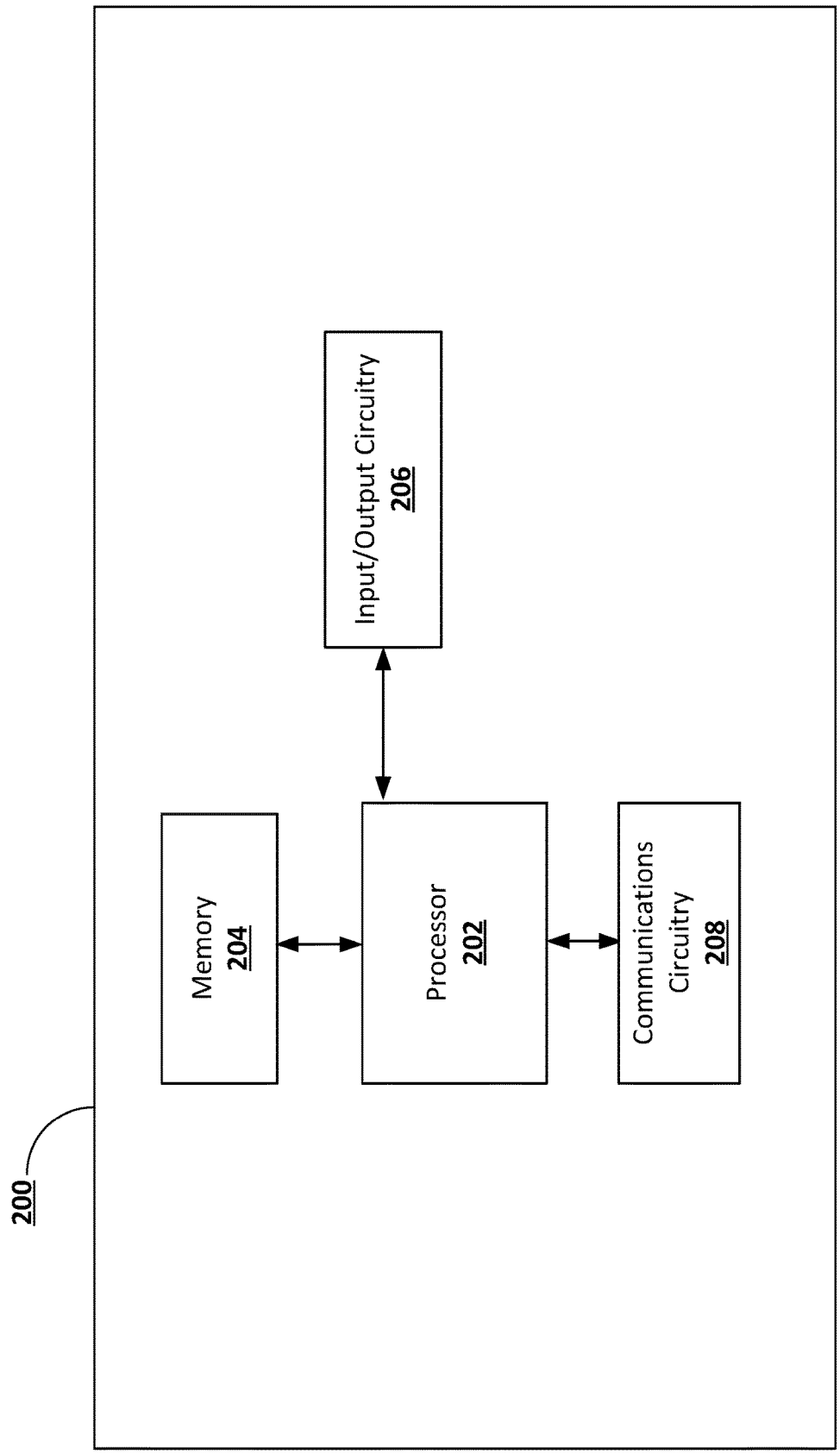

FIG. 2 is an exemplary schematic diagram of a data server computing device in accordance with one or more embodiments of the present disclosure.

Figure 3:
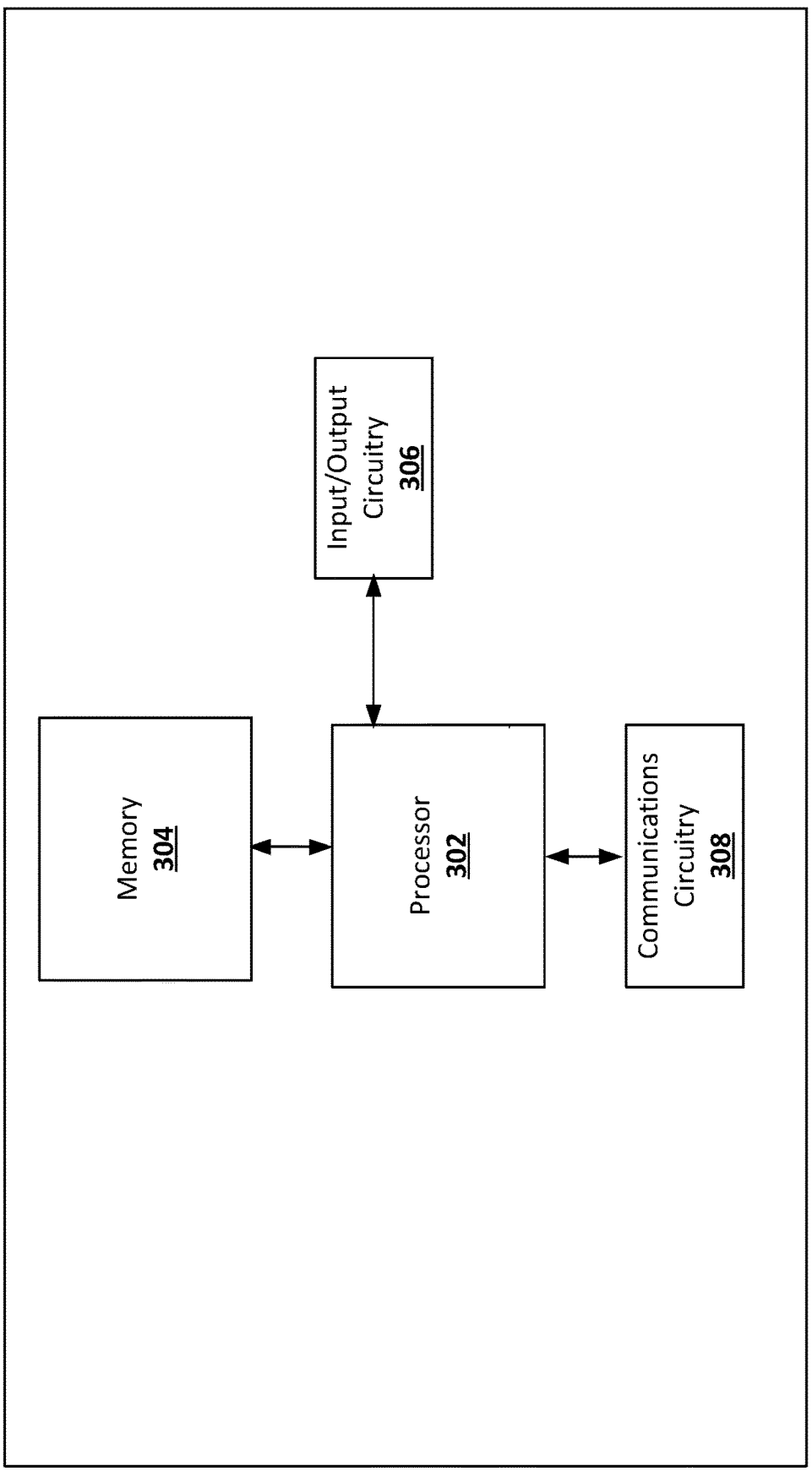

FIG. 3 is an exemplary schematic diagram of a client computing device in accordance with one or more embodiments of the present disclosure.

Figure 4:
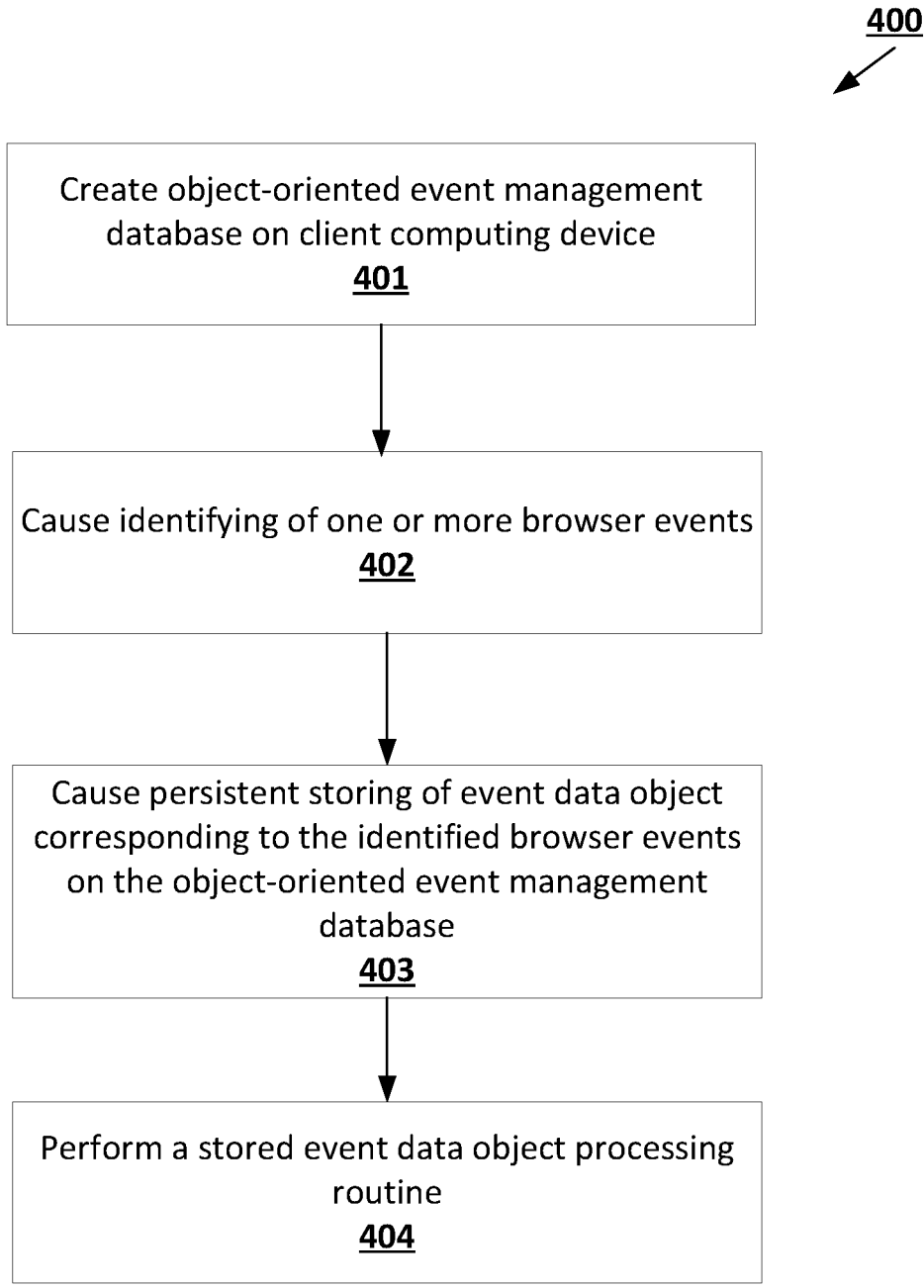

FIG. 4 is a flowchart diagram of an example process for browser event synchronization management in accordance with one or more embodiments of the present disclosure.

Figure 5:
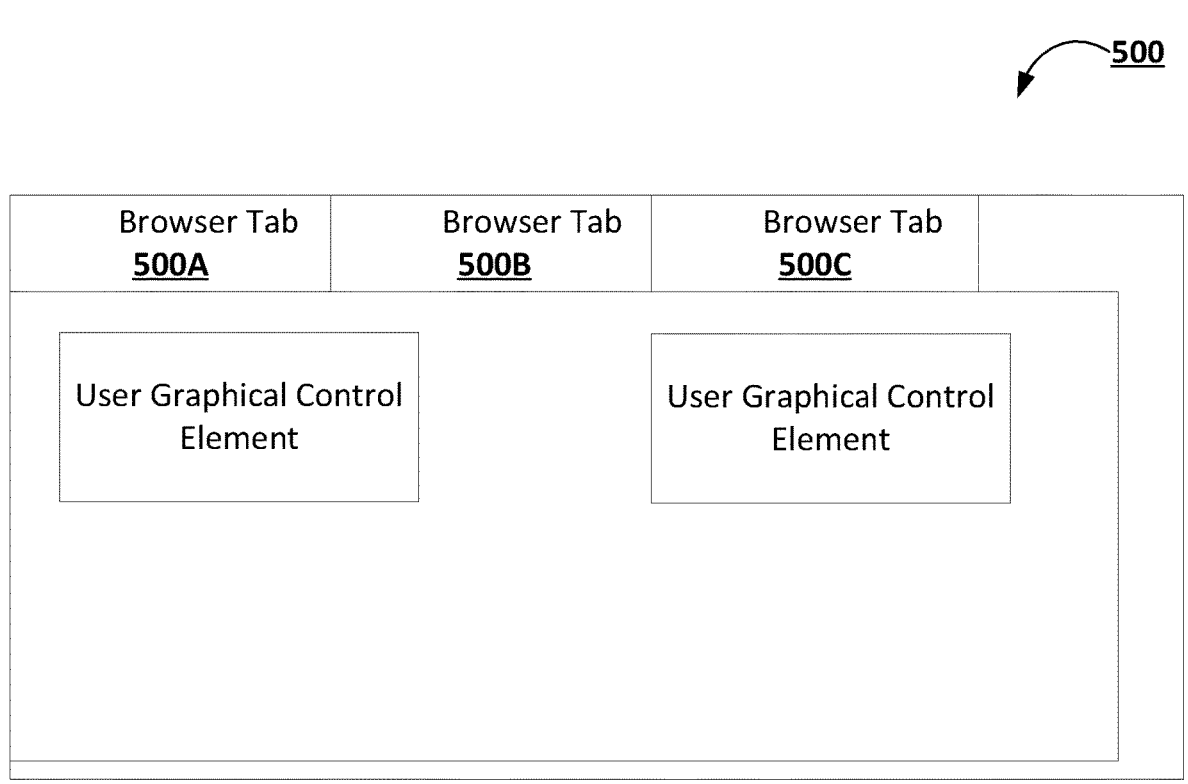

FIG. 5 provides an operational example of a user interface configured for multi-tab user engagement in accordance with one or more embodiments of the present disclosure.

Figure 6:
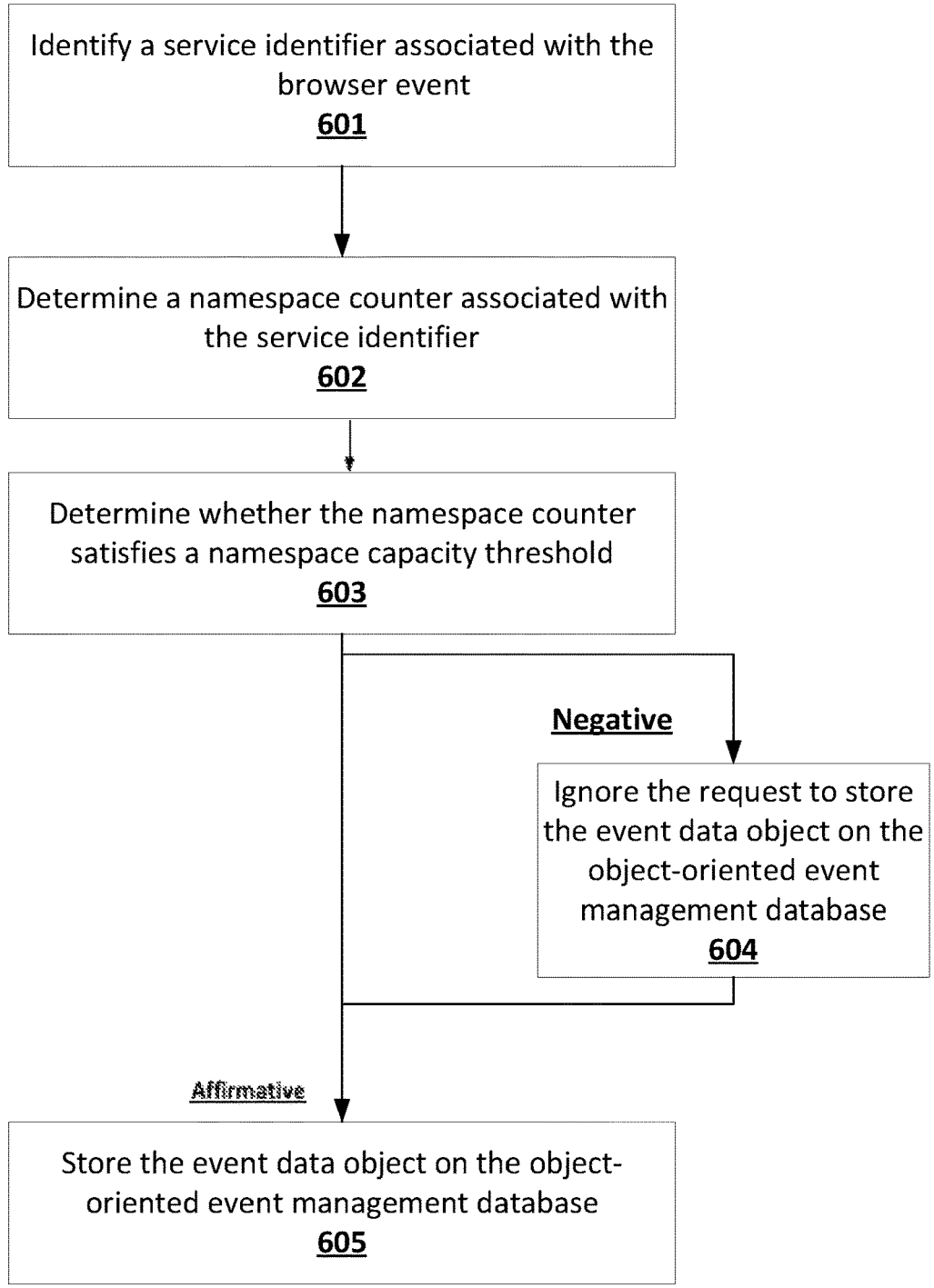

FIG. 6 is a flowchart diagram of an example process for storing event data objects in accordance with one or more embodiments of the present disclosure.

Figure 7:
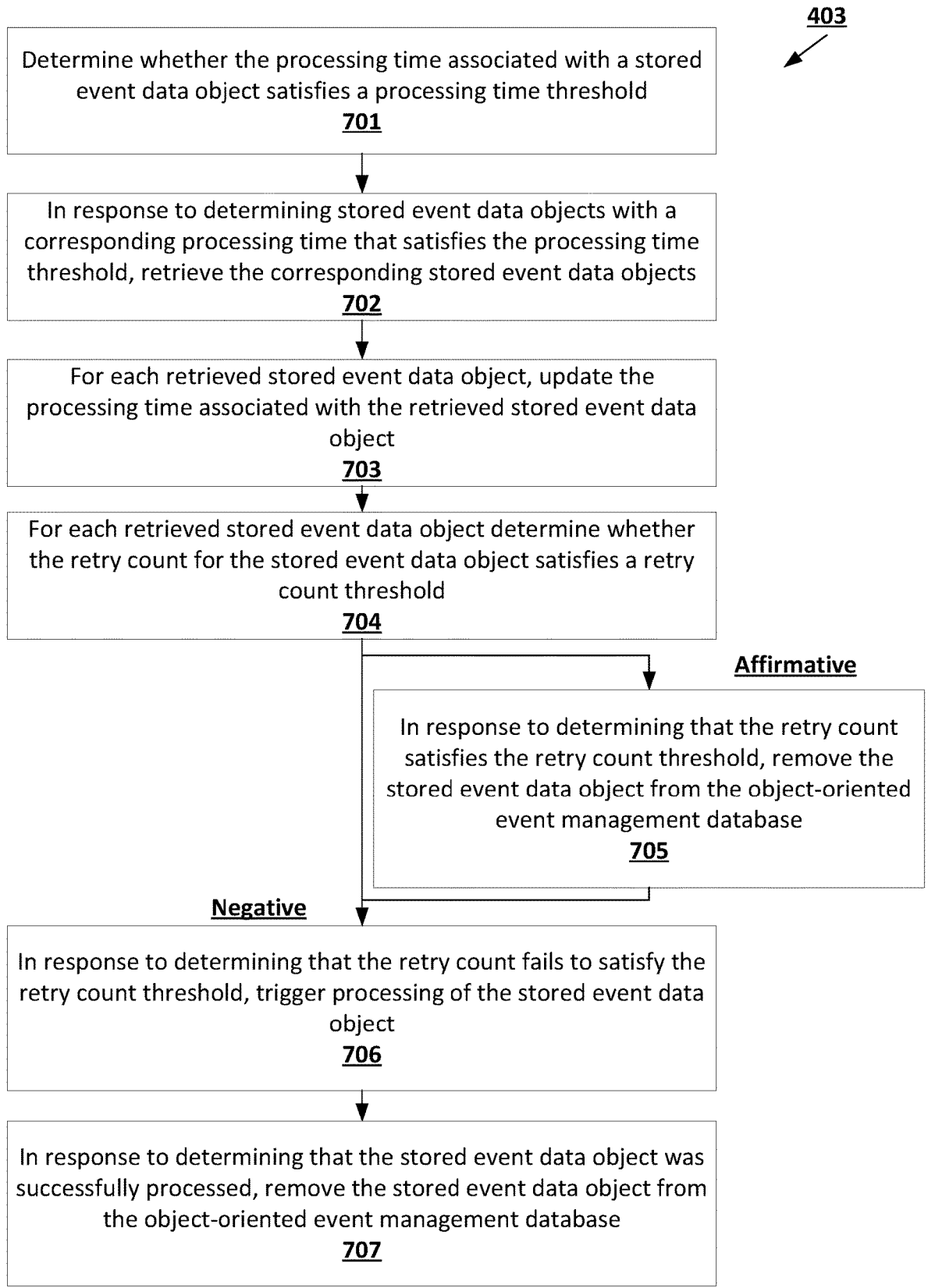

FIG. 7 is a flowchart diagram of an example process for performing a stored event data object processing routine in accordance with one or more embodiments of the present disclosure.

Figure 8:
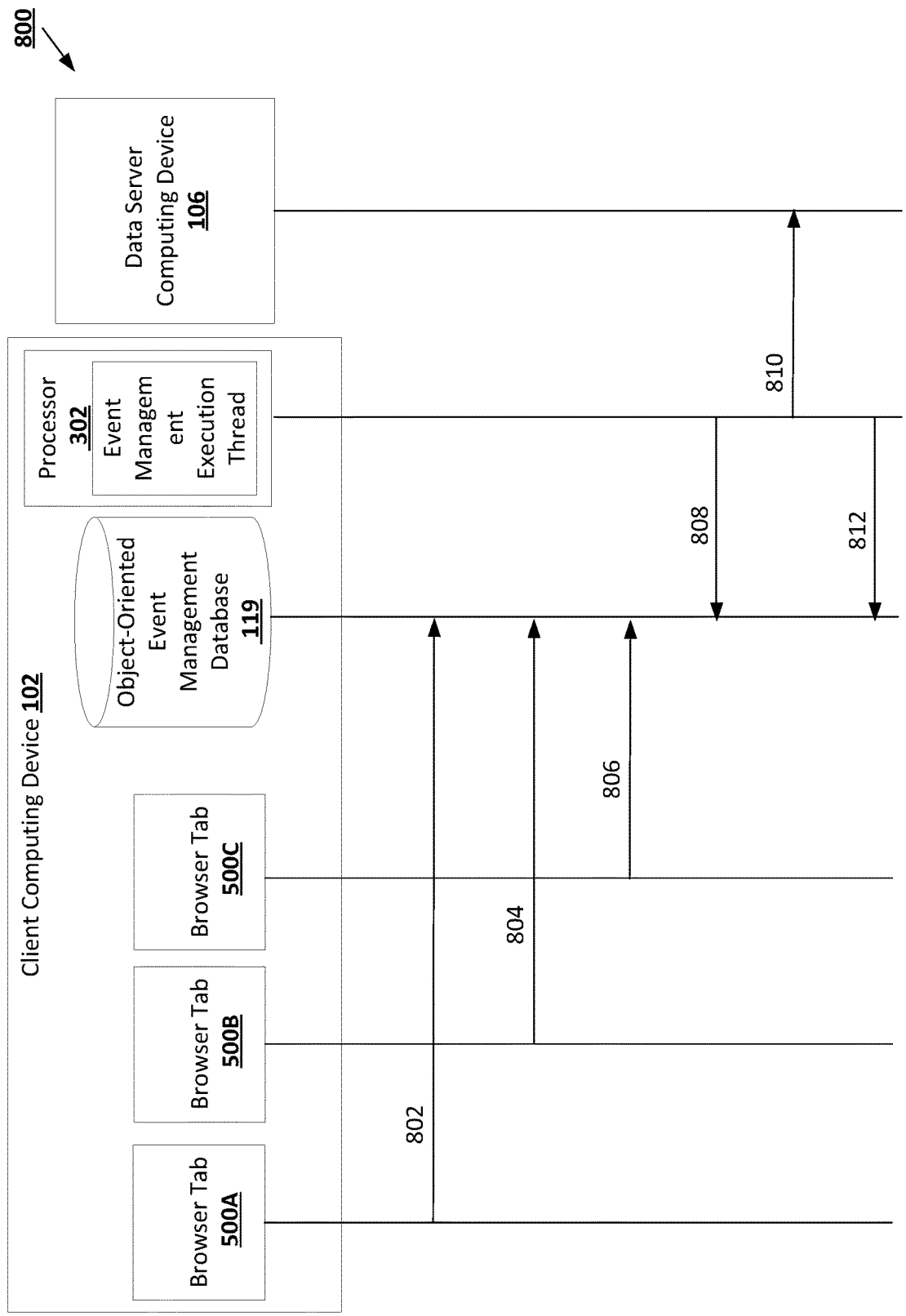

FIG. 8 provides a signal diagram of an example browser event synchronization management process in accordance with one or more embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

As computer monitors have become less expensive and monitor sizes have increased, modern enterprise users have begun to configure their workspaces with multiple large monitors to give them vast display areas in which to engage one or more software applications.

Performing browser event synchronization of opened browser tabs accessing a web-based software application on a tab-by-tab basis can be computationally expensive because it generally involves transmitting, by each browser tab and to a network host server, several independent events, which are typically processed on a primary execution thread. This approach also results in network inefficiency, high network traffic, and higher latency. Other software productivity metrics can be negatively affected including higher memory usage at the client and server and poor total time to interactive (TTI) performance.

Various embodiments of the present disclosure address technical problems associated with efficiently and reliably managing browser event synchronization, particularly in the multi-tab software engagement circumstance discussed above. To address the above-noted shortcomings, various embodiments of the present disclosure are configured to transmit or otherwise sync browser events to network host servers in batches. Thus, fewer transmissions occur over the network and processing by the host server is reduced.

Moreover, embodiments herein ensure the benefits of fewer transmissions of events remain intact when multiple browser tabs are associated with a common origin because embodiments herein provide safeguards that eliminate collisions (e.g., multiple transmissions of a single event by multiple browser tabs, resulting in redundant or incorrect data reported to the server) between the multiple browser tabs associated with a common origin. Conventional systems may be configured such that a single instance of an object-oriented event management database can only be associated with browser events that are associated with a single origin (e.g., defined by one or more of a protocol (e.g., HTTP or HTTPs), a domain, or a port). Further, conventional browser tabs may be configured to automatically report browser events to a server. In such configurations, if multiple browser tabs (e.g., a browser tab associated with Jira® and a browser tab associated with Confluence®) are associated with a common origin (e.g., Jira® and Confluence® may have the same origin) and therefore browser events associated with the multiple browser tabs are saved to a single instance of an object-oriented event management database, there may be resulting collisions when each of the multiple browser tabs attempts to retrieve and report respective browser events to the server. Embodiments herein overcome such drawbacks and eliminate the possibility of such collisions by controlling how and when browser events saved within a single instance of an object-oriented event management database, and associated with multiple browser tabs associated with a common origin, may be transmitted to the server. Embodiments herein further eliminate the possibility of such collision through monitoring of timestamps associated with browser events that have or have not been reported to the server, and by controlling when event data objects are removed or deleted from the object-oriented event management database.

Various additional embodiments discussed herein are configured to perform asynchronous processing of browser events. Asynchronous processing of browser events means that the browser events are processed through a procedure that is performed independent of a primary execution thread. In other words, the primary execution thread is not blocked in order to process browser events. Thus, by asynchronously processing browser events, a computer system can process events independently of the primary execution thread, a technique that in turn can reduce browser event processing latency.

Accordingly, by introducing the above-noted techniques, various embodiments of the present disclosure make important technical contributions to improving efficiency and reliability of browser event synchronization management, particularly in a federated system that supports multiple different software applications.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "or" is used herein in both the alternative and conjunctive sense, unless otherwise indicated. The terms "illustrative," "example," and "exemplary" are used to be examples with no indication of quality level.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The term "circuitry" should be understood broadly to include hardware and, in some embodiments, software for configuring the hardware. For example, in some embodiments, "circuitry" may include processing circuitry, storage media, network interfaces, input/output devices, and the like.

The terms "end-user," "user," and similar terms should be understood to refer to an individual, group of individuals, business, organization, and the like. The users referred to herein may access software applications associated with a federated system using client devices/client computing devices (as defined herein).

The terms "client computing device," "client device," "client computer device," and similar terms refer to a combination of computer hardware and/or software that is configured to access at least one software application that is made available by a software application server. The software application server is often (but not always) on another computer system, in which case the client computing device accesses the software application by way of a network. Client computing devices may include, without limitation, smart phones, tablet computers, laptop computers, wearables, personal computers, enterprise computers, and the like.

The term "application," "software application," "application software," "app" or similar terms refer to a computer program or group of computer programs designed for use by an interaction with one or more networked or remote computing devices. In some embodiments, an application refers to a mobile application, a desktop application, a command line interface (CLI) tool, or another type of application. Examples of an application comprise workflow engines, service desk incident management, team collaboration suites, cloud components, word processors, spread sheets, accounting applications, browsers, email clients, media players, file viewers, video games, and photo/video editors. An application can be supported by one or more components either via direct communication with the component or indirectly by relying on a component that is in turn supported by one or more other components. An application may support multi-tab software engagement, where a user may engage with an application across multiple different browser windows or browser tabs (as described below).

The term "browser tab" refers to one or more user interface elements configured to be displayed by a browser application as part of its graphical user interface, where a user interface element refers to any collection of one or more data items that are configured for rendering using a display device and that form part of a graphical user interface. User interface elements may be defined by semantic rules of a programming language designed to facilitate user interface design. Examples of user interface elements include input-receiving user interface elements (e.g., buttons, text entry fields, date entry fields, checkboxes, sliders, menu bars, links, etc.) and output-displaying user interface elements (e.g., message boxes, modal windows, progress bars, icons, tooltips, images, etc.). A browser tab may be associated with accessing a software application having a particular origin.

The term "browser event" refers to an operation, action, or the like that occurs within a browser application, is triggered by interaction with a browser application, or is otherwise related to a browser application, and which results in changed HTML, CSS, logs, or other files that are stored locally at a client computing device but which must be synced to a host server (e.g., an entity interested in tracking the events for, as an example, analytics reasons). A browser event, may be generated by user engagement with a software application via a browser used to access and/or interact with the software application. Examples of such user engagement may include mouse clicks, page refreshes, button clicks, user inputs, user selections, and the like. In various embodiments, a browser event is associated with or otherwise causes one or more event data objects (described below) to be generated. A browser event may be associated with a particular browser tab of a browser. In various embodiments, a browser event comprises an analytics event.

The term "analytics event" may refer to an operation, action, interaction, or the like that occurs within a browser tab associated with accessing a software application, and is configured to be utilized in determining information/data/insights relating to end users' interactions with the respective software application. For example the number of views of a page may be determined based at least in part on analytics events. As another example, estimated read time of a particular page may be determined based at least in part on analytics events. Examples of analytics events include, without limitation, page openings, clicks, file downloads, hovering of a mouse or cursor over a particular interface area, form submissions, closing of pages, and/or the like. Further examples of analytics events may be associated with background browser tabs. For example, a browser tab that has gone out of focus, or a browser tab that has been displaying search results for a particular duration of network time.

The term "origin" refers to a source associated with a URL or browser tab. For example, two URLs or browser tabs have a common origin if the protocol (e.g., HTTP or HTTPs, or the like), port (e.g., a communication endpoint), and host or domain (e.g., device or server connected to the network) are the same for both.

The term "event data object" refers to a data object (e.g., files, arrays, logs, and/or the like) that represent, define, or otherwise relate to a particular browser event that is configured to be persistently stored in a browser utilizing an object-oriented event management database (described below) associated with the browser. For example, an event data object may be stored locally at a client computing device on an object-oriented event management database therein. For example, an event data object may correspond to an analytics event configured to be persistently stored on an object-oriented event management database at a client computing device.

The term "object-oriented event management database" refers to a database that is stored at a client computing device and is accessible by one or more computing devices of the client computing device executing instructions for retrieval, storage, and/or transmission of one or more event data objects corresponding to browser events (described below). In some embodiments, the object-oriented event management database is configured for persistently storing events data objects corresponding to unprocessed browser events, where an unprocessed browser event describes a browser event that has not been synced to a host server (e.g., data server computing device) associated with the browser event. The object-oriented event management database may be indexed-based, where an event data object stored therein may be retrieved based at least in part on a specified property. In some embodiments, an event data object stored in the object-oriented event management database may be associated with an event key, where the event key may be utilized in retrieving the corresponding stored event data object. An event key may be an array, a string, a date, and/or the like. In some embodiments, The object-oriented event management database may comprise one or more object stores, where each object store may be configured for storing a particular type of data. The storing and/or retrieving of event data objects from an object-oriented event management database may be performed using one or more event management execution threads (described below) that are executed asynchronously relative to the primary execution thread (described below).

The term "primary execution thread" refers to a segment of a process associated with a software or browser application that is configured for executing one or more operations, instructions, tasks, and/or the like associated with the software or browser application, including operations, instructions, tasks, and/or the like associated with updating a user interface associated with the software or browser application. For example, a primary execution thread may be configured to perform sequential webpage interaction operations (described below) based at least in part one or more webpage interaction requests provided by an end user of a software application accessed via a browser application. (e.g., modifying a page of a browser tab based on an accessed software application).

The term "sequential webpage interaction operations" refers to operation, instructions, tasks, and/or the like that are executed on a primary execution thread associated with a software or browser application, where each operation, instruction, and/or tasks are executed in sequence. For example, performing sequential webpage interaction operations may comprise synchronous execution of the corresponding operations, instructions, and/or tasks.

The term "webpage interaction request" refers to a write request and/or a read request triggered by an end user's interaction, using a client device, with a browser tab associated with a software application or otherwise provided by an end user of the software application via the browser application or tab.

The term "event management execution thread" refers to a segment of a process, associated with a software or browser application that is configured for executing one or more operations, instructions, tasks, and/or the like associated with the software or browser application independent of the primary execution thread. In various embodiments, an event management execution thread may be configured for executing particular operations, instructions, tasks, and/or the like. For example, one or more event management execution threads may be configured for performing synchronization to a host server with respect to one or more browser event types (e.g., analytics events). For example, an event data object may be stored on an object-oriented event management database using one or more event management execution threads. As another example, stored event data object processing routines (described below) may be performed using one or more event management execution threads.

The term "stored event data object processing routine" refers to the processing of event data objects corresponding to unprocessed browser events (described below) that are stored in the object-oriented event management database. A stored event data object processing routine may include batch processing, where a plurality of event data objects corresponding to unprocessed browser events are retrieved from the object-oriented event management database and transmitted to a data server computing device to be synced to the data server computing device. In some embodiments events data objects stored on the object-oriented event management database may be retrieved based at least in part on a retrieval scheduling policy (described below).

The term "retrieval scheduling policy" may refer to a set of rules, instructions, or process configured for managing the processing sequence of stored event data objects.

The term "unprocessed browser event" refers to a browser event that is stored on an object-oriented event management database and is yet to be processed or synchronized to a host server. For example, an unprocessed browser event may describe a browser event that is stored at a client computing device but that has not been transmitted to a host server (e.g., software application server) or otherwise synced to a host server (e.g., software application server).

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 depicts an exemplary browser event synchronization management system architecture 100 within which embodiments of the present disclosure may operate. As shown in FIG. 1, the exemplary browser event synchronization management system architecture 100 includes one or more client computing devices 102 and a data server computing device 106. The client computing devices 102 may be configured to store browser events and transmit the stored browser events to the data server computing device 106 to sync to the data server computing device 106. The data server computing device 106 may support a plurality of software applications of an enterprise system or otherwise be associated with the plurality of software applications of an enterprise platform (e.g., Jira®, Confluence®, and/or Trello®).

The client computing devices 102 and the data server computing device 106, may communicate over one or more networks, such as network 105. The network 105 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

The data server computing device 106 may include a browser event processing module 112. The browser event processing event module 112 may be configured for facilitating browser event synchronization management operations. For example, the browser event module 112 may be configured for creating and/or storing on the client computing device 102, an object-oriented event management database 119 associated with one or more software applications accessible via a browser application. As another example, the browser event processing event module 112 may be configured to receive event data objects corresponding to unprocessed events from the client computing device 102. As yet another example, the browser event processing module 112 may be configured for facilitating syncing of the received events.

The data server computing device 106 may include a storage subsystem 108. Furthermore, the storage subsystem 108 may include an in-memory cache storage unit 115. The storage subsystem 108 may include one or more storage units, where each storage unit may store at least one of one or more data assets and/or one or more data about the computed properties of one or more data assets. Moreover, each storage unit may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The client computing devices 102 may also include a storage subsystem 104. As discussed above in relation to the data server computing device 106, the storage subsystem 104 may include an object-oriented event management database 119 associated with one or more software applications. The object-oriented event management database 119 may be configured for storing persistently therein event data objects that correspond to browser events generated by a browser tab of the one or more software applications associated with the object-oriented event management database 119. Furthermore, the storage subsystem 104 may include an in-memory cache storage unit 114. The storage subsystem 104 may include one or more storage units, where each storage unit may store at least one of one or more data assets and/or one or more data about the computed properties of one or more data assets. Moreover, each storage unit may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Data Server Computing Device

The data server computing device 106 may be embodied by one or more computing systems, such as apparatus 200 shown in FIG. 2. The apparatus 200 may include processor 202, memory 204, input/output circuitry 206, and a communications circuitry 208. The apparatus 200 may be configured to execute the operations described herein.

Although the components 200-208 are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the data server computing device 106 to carry out various functions in accordance with example embodiments of the present disclosure.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client computing device, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

FIG. 3 is an exemplary schematic diagram of a client computing device (e.g., a client computing device that is a limited interaction device or a client computing device that is a non-limited interaction device) that may be embodied by one or more computing systems, such as apparatus 300 shown in FIG. 3. The apparatus 300 may include processor 302, memory 304, input/output circuitry 306, and communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or coprocessor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

FIG. 4 is a flowchart diagram of an example process 400 for managing browser events across multiple browser tabs and across multiple software applications of an enterprise platform. Via the various operations of the process 400, the browser event synchronization management system 100 can facilitate syncing of browser events across multiple browser tabs, where each browser tab may be associated with a common or different origin, to facilitate efficient and reliable browser events synchronization operations.

The process 400 begins at step/operation 401 when the data server computing device 106 creates an object oriented event management database 119 on the client computing device 102 that is accessing, using one or more browser tabs, one or more software applications associated with the data server computing device 106. The data server computing device 106 may be associated with a plurality of software applications. In embodiments, each software application may be associated with an enterprise platform. Furthermore, in embodiments, each browser tab of the one or more browser tabs may be associated with a different origin.

At step/operation 402, the data server computing device 106 causes the one or more browser tabs to identify one or more browser events. For example, in embodiments, the data server computing device 106 may cause each browser tab to identify a browser event generated based at least in part on an end user interaction with the corresponding browser tab. As an example, an end user associated with the client computing device 102 may access, during a session, using a plurality of browser tabs, a plurality of software applications associated with an enterprise platform. In the noted example, the data server computing device 106 may cause each browser tab of the plurality of browser tabs to identify each browser event generated during the session by the corresponding browser tab, where as noted above, each browser event may generated based at least in part on the end user interaction with the corresponding browser tab.

As another example, an end user associated with the client computing device 102 may access, over multiple sessions, using a plurality of browser tabs, a plurality of software applications associated with an enterprise platform. In the noted example, the data server computing device 106 may cause each browser tab of the plurality of browser tabs to identify each browser event generated during each session by the corresponding browser tab. In various embodiments, the one or more browser events may be an analytics event. Examples of such analytics-based browser events include mouse clicks with respect to the one or more browser tabs, form submission via the one or more browser tab, link clicks on the one or more browser tabs, and/or the like.

Referring now to FIG. 5, which depicts an operational example of a user interface 500 configured for multi-tab user engagement. As shown in FIG. 5, the software application interface 500 may comprise a plurality of browser tabs 500A-C that is used to access the one or more software applications. For example, browser tab 500A and browser tab 500B may be used to access a first software application (e.g., Jira® application by Atlassian Pty. Ltd.) and browser tab 500C may be used to access a second software application (e.g., Confluence® application by Atlassian Pty. Ltd.). As another example, each of the browser tabs 500A-C may be used to access the same software application. Furthermore, browser tabs 500A-B may be associated with a common first origin and browser tab 500C may be associated with a second origin, where the first origin and the second origin are different. Each browser tab 500A-C may be configured to enable a user associated with the client computing device 102 displaying the browser tabs 500A-C to interact with the browser tabs. Thus, generating a plurality of browser events across the plurality of browser tabs.

It will be appreciated that, while the description herein may depict embodiments with respect to storing event data objects in an instance of an object-oriented event management database, the disclosure further relates to embodiments where multiple instances of an object-oriented event management database are created on the client computing device, where each instance of the object-oriented event management database is associated with a unique origin of a plurality of origins. In such embodiments, if multiple browser tabs are associated with a common origin, there may be more browser tabs than instances of the object-oriented event management database because a single instance of the object-oriented event management database may support or be used for storage of browser events for those multiple browser tabs having a common origin.

Returning to FIG. 4, at step/operation 403, the data server computing device 106 causes the one or more browser tabs to persistently store the identified browser events on the object-oriented event management database 119. In various embodiments, storing the identified browser events on the object-oriented event management database 119 may comprise, for each identified browser event, persistently storing an event data object corresponding to the browser event and the domain associated therewith within the object-oriented event management database 119. For example, the data server computing device 106 may cause each browser tab of the one or more browser tabs to persistently store on the object-oriented event management database, event data objects corresponding to the browser events identified by the corresponding browser tab. In embodiments, each identified browser event stored on the object-oriented event management database 119 may describe an unprocessed browser event that describes a browser event that has not been transmitted to the data server computing device 106 or that has not otherwise been synced to the data server computing device 106.

Each event data object stored within the object-oriented event management database 119 may comprise or otherwise be associated with one or more properties. In embodiments, the one or more properties may include a timestamp that describes the network time at which the corresponding event data object was stored in the object-oriented event management database 119, a processing time that describes when the corresponding stored event data object is to be processed, a retry count that describes a count of processing attempts with respect to the corresponding event data object, and/or the like. Each event data object stored on the object-oriented event management database 119 may describe or otherwise comprise a record of the plurality of records on the object-oriented event management database 119.

The plurality of records (thus, stored event data objects) may be organized based at least in part on the one or more properties associated with the event data objects. For example, the stored event data objects may be searched, sorted, retrieved, and/or the like based at least in part on one or more of the associated properties. For example, the stored event data objects may be sorted and/or retrieved based at least in part on the processing time associated with each event data object stored on the object-oriented event management database 119. In embodiments, each event data object stored on the object-oriented event management database 119 may be associated with an event key. In embodiments, where a stored event data object may be retrieved based at least in part on the associated event key.

In various embodiments, each event data object is stored on or within the object-oriented event management database 119 using one or more event management execution threads independent of the primary execution thread that is configured to perform one or more sequential webpage interaction operations based on one or more webpage interaction requests provided by an end user of the browser software application. In various embodiments, storing the one or more browser events comprise generating an event write request, wherein the event write request describes a request to store a browser event associated with a particular browser tab of the one or more browser tabs on the object-oriented event management database 119.

In various embodiments, the process 403 may be performed in accordance with process depicted in FIG. 6, which is an example process for storing an event data object corresponding to an identified browser event on the object-oriented event management database 119. At step/operation 601, the data server computing device 106 causes the client computing device 102 (e.g., processor 302) to identify a service identifier associated with the browser event. A service identifier may describe one or more data items or elements by which a software application is uniquely identified. For example, a service identifier may describe one or more data items or elements by which each software application of the plurality of software applications associated with an enterprise platform is uniquely identified.

At step/operation 602, the data server computing device 106 causes the client computing device 102 (e.g., processor 302), to determine a namespace counter associated with the service identifier. The namespace counter may describe a count of a subset of one or more stored event data objects that are associated with a service identifier. In embodiments, each service identifier may be associated with a namespace counter threshold.

At step/operation 603, the data server computing device 106 causes the client computing device 102 (e.g., processor 302) to determine whether the namespace counter associated with the service identifier satisfies a namespace capacity threshold.

At step/operation 604, in some embodiments, in response to determining that the namespace counter fails to satisfy the namespace capacity threshold, the data server computing device 106 may cause the client computing device 102 (e.g., processor 302) to ignore the event write request (e.g., the request to store the event data object on the object-oriented event management database 119). In some embodiments, in response to determining that the namespace counter fails to satisfy the namespace capacity threshold, the data server computing device 106 may cause the client computing device 102 (e.g., processor 302) to abandon the event write request and generate a storage error describing that the browser events was not stored on the object-oriented event management database 119.

In some embodiments, in response to determining that the namespace counter fails to satisfy the namespace capacity threshold, the data server computing device 106 may cause the client computing device 102 (e.g., processor 302) to (i) delete/remove, from the object-oriented event management database 119, the oldest stored event data object of the one or more stored event data objects on the object-oriented event management database 119 and (ii) using an event management execution thread of the one or more event management execution threads, store the event data object corresponding to the identified browser event on the object-oriented event management database 119. In some embodiments, the oldest stored event data object may be deleted/removed, from the object-oriented event management database 119, based at least in part on the timestamp associated with each stored event data object. For example, deleting/removing the oldest stored event data object may comprise identifying the event data object in the object-oriented event management database 119 with the earliest timestamp.

At step/operation 605, in response to determining that the namespace counter satisfies the namespace capacity threshold, the data server computing device 106 causes the client computing device 102 (e.g., processor 302) to store the event data object on the object-oriented event management database 119 using an event management execution thread of one or more event management execution threads.

Returning to FIG. 4, at operation 404, the data server computing device 106 causes the client computing device 102 (e.g., processor 302) to perform a stored event data object processing routine using one or more event management execution threads that are executed asynchronously relative to the primary execution thread. In some embodiments, a stored event data object processing routine is performed based at least on a set of defined rules and/or defined intervals. In some embodiments, performing a stored event data object processing routine comprise retrieving one or more stored event data objects from the object-oriented event management database 119 for transmitting to the data server computing device 106.

In some embodiments, the one or more stored event data objects is retrieved from the object-oriented event management database 119 based at least in part on a retrieval scheduling policy. A retrieval scheduling policy may describe a set of rules configured for managing the processing sequence of event data objects (e.g., timing rules for sending events to the data server computing device 106). In various embodiments, the retrieval scheduling policy includes retrieving from the object-oriented event management database 119 or otherwise attempting to retrieve from the object-oriented event management database 119 all stored event data objects that satisfy a processing time threshold. In various embodiments, the step/operation 404 may be performed in accordance with the process depicted in FIG. 7 which is an example process for performing a stored event data object processing routine.

At step/operation 701, the data server computing device 106 causes the client computing device 102 (e.g., processor 302) to determine whether the processing time associated with a particular stored event data object satisfies a processing time threshold. In some embodiments, the processing time threshold may be configured to be the current network time, where a stored event data object with a processing time earlier than the current network time is deemed to satisfy the processing time threshold.

At step/operation 702, in response to determining stored event data objects with a corresponding processing time that satisfies the processing time threshold, the data server computing device 106 causes the client computing device 102 (e.g., processor 302) to retrieve, from the object-oriented event management database 119, each of the corresponding stored event data object or otherwise attempt to retrieve, from the object-oriented event management database 119, each of the corresponding stored event data object.

At step/operation 703, for each retrieved event data object, data server computing device 106 causes the client computing device 102 (e.g., processor 302) to update the processing time associated with the retrieved event data object, where updating the processing time for each retrieved event data object comprises assigning to each retrieved event data object a processing time that is in the future. For example, in some embodiments, the updated processing time may be one minute in the future, five minutes in the future, and or the like. As an example, if the current network time is 5:00 pm, the client computing device 102 may be configured to assign each retrieved stored event data object an updated processing time of 5:01 pm.

At step/operation 704, for each stored event data object, the data server computing device 106 causes the client computing device 102 (e.g., processor 302) to determine whether the retry count for the stored event data object satisfies a retry count threshold. For example, in various embodiments, for each retrieved stored event data object, the retry count with respect to the stored event data object is compared with a retry count threshold.

At step/operation 705, for each retrieved stored event data object, in response to determining that the retry count satisfies the retry count threshold, the data server computing device 106 causes the client computing device 102 (e.g., processor 302) to deletes/removes the stored event data object from the object-oriented event management database 119.

At step/operation 706, for each retrieved stored event data object, in response to determining that the stored event data object fails to satisfy the retry count threshold, the data server computing device 106 causes the client computing device 102 (e.g., processor 302), to trigger processing of the stored event data object and waits for the results (e.g., whether the corresponding event was successfully processed), where processing the stored event data object comprise transmitting the retrieved stored event data object to the data server computing device 106 to cause syncing of the corresponding event associated with the stored event data object to the data server computing device 106.

At step/operation 707, for each transmitted stored event data object, in response to determining that the stored event data object was successfully processed (e.g., successfully transmitted to the data server computing device 106, the data server computing device 106 causes the client computing device 102 (e.g., processor 302) to deletes/removes the stored event data object from the object-oriented event management database 119.

FIG. 8 is a signal diagram 800 of an example browser event synchronization management process in accordance with one or more embodiments of the present disclosure. In embodiments, the data server computing device 106 causes the client computing device 102 (e.g., processor 302) to: (i) identify a first browser event generated by a browser tab 500A accessing a first software application and stores 802 event data object corresponding to the first browser event on the object-oriented event management database 119; (ii) identifies a second browser event generated by a browser tab 500B accessing the first software application and stores 804 event data object corresponding to the second browser event on the object-oriented event management database 119; and (iii) identifies a third browser event generated by a browser tab 500C accessing a second software application and stores 806 the event data object corresponding to the browser event on the object-oriented event management database 119.

In embodiments, data server computing device 106 causes the client computing device 102 (e.g., processor 302) to retrieve 808, from the object-oriented event management database 119, stored event data objects whose processing time satisfies a processing time threshold. In embodiments, the data server computing device 106 causes the client computing device 102 (e.g., processor 302) to transmit 810 the event data corresponding to retrieved event data objects whose retry count fails to satisfy the retry count threshold to the data server computing device 106. In embodiments, the data server computing device 106 causes the client computing device 102 (e.g., processor 302) to delete/remove 812 retrieved stored event data objects that were successful transmitted to the data server computing device 106 or otherwise synced to the data server computing device 106.

Additional Implementation Details

Although example processing systems have been described in FIGS. 1-9, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "processor" or "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a browser on a user's client computing device in response to requests received from the browser.

Embodiments of the subject matter described herein can be implemented in a computing system that includes a back-end component, e.g., as an information/data server including a client event sequencing server, or that includes a middleware component, e.g., a software application server, or that includes a front-end component, e.g., a client computing device having a graphical user interface or a browser through which a user can interact with an implementation of the subject matter described herein, or any combination of one or more such back-end, middleware, or front-end components. The components of the system can be interconnected by any form or medium of digital information/data communication, e.g., a wireless communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client computing device (e.g., for purposes of displaying information/data to and receiving user input from a user interacting with the client computing device). Information/data generated at the client computing device (e.g., a result of the user interaction) can be received from the client computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for browser event management across a plurality of browser tabs, the apparatus comprising at least one processor and at least one memory including program code, the at least one memory and the program code configured to, with the at least one processor, cause the apparatus to at least:
   create, on a client device, an object-oriented event management database associated with one or more browser tabs of the plurality of browser tabs, wherein each browser tab is configured for accessing one or more software applications, and wherein each software application of the one or more software applications is associated with an origin of a plurality of origins;
   cause identifying of a browser event associated with a browser tab of the plurality of browser tabs;
   cause storing of event data object corresponding to the browser event within the object-oriented event management database associated with an origin associated with the browser tab; and
   cause performing, using one or more event management execution threads that are executed asynchronously relative to a primary execution thread, a stored event data object processing routine configured to at least prevent duplicate transmission of event data corresponding to the stored event data object to a server computing device, wherein performing the stored event data object processing routine comprises retrieving the stored event data object from the object-oriented event management database for transmission to the server computing device in response to a processing time associated with the stored event data object satisfying a processing time threshold.

2. The apparatus of claim 1, wherein an origin is defined by one or more of a protocol, a domain, or a port.

3. The apparatus of claim 1, wherein event data objects associated with two or more browser tabs having a common origin are stored in a first object-oriented event management database of a plurality of object-oriented event management databases, wherein the first object-oriented event management database is associated with the common origin.

4. The apparatus of claim 1, wherein the event data object is stored on the object-oriented event management database using the one or more event management execution threads.

5. The apparatus of claim 1, wherein performing the stored event data object processing routine further comprises:
   removing the stored event data object from the object-oriented event management database.

6. The apparatus of claim 1, wherein the object-oriented event management database comprises one or more stored event data objects corresponding to one or more unprocessed browser events, wherein the one or more stored event data objects are retrieved in accordance with a retrieval scheduling policy associated with the object-oriented event management database.

7. The apparatus of claim 1, wherein storing the event data object comprises:
   identifying a service identifier associated with the browser event;
   determining a namespace counter associated with the service identifier, wherein the namespace counter describes a count of a subset of one or more stored event data objects that are associated with the service identifier;
   determining whether the namespace counter satisfies a namespace capacity threshold; and
   in response to determining that the namespace counter fails to satisfy the namespace capacity threshold:
      removing, from the object-oriented event management database, an oldest stored event data object based at least in part on a timestamp associated with each stored event data object of the one or more stored event data objects.

8. The apparatus of claim 1, wherein storing the event data object comprises:
   identifying a service identifier associated with the browser event;
   determining a namespace counter associated with the service identifier, wherein the namespace counter describes a count of a subset of one or more stored event data objects that are associated with the service identifier;
   determining whether the namespace counter satisfies a namespace capacity threshold; and
   in response to determining that the namespace counter satisfies the namespace capacity threshold:
      storing the event data object within the object-oriented event management database.

9. The apparatus of claim 1, wherein the object-oriented event management database stores the stored event data object in association with an event key.

10. A computer-implemented method for browser event management across a plurality of browser tabs, the computer-implemented method comprising:
   creating, on a client device, an object-oriented event management database associated with one or more browser tabs of the plurality of browser tabs, wherein each browser tab is configured for accessing one or more software applications, and wherein each software application of the one or more software applications is associated with an origin of a plurality of origins;

causing identifying of a browser event associated with a browser tab of the plurality of browser tabs;

causing storing of event data object corresponding to the browser event within the object-oriented event management database associated with an origin associated with the browser tab; and causing performing, using one or more event management execution threads that are executed asynchronously relative to a primary execution thread, a stored event data object processing routine configured to at least prevent duplicate transmission of event data corresponding to the stored event data object to a server computing device, wherein performing the stored event data object processing routine comprises retrieving the stored event data object from the object-oriented event management database for transmission to the server computing device in response to a processing time associated with the stored event data object satisfying a processing time threshold.

11. The method of claim 10, wherein an origin is defined by one or more of a protocol, a domain, or a port.

12. The method of claim 10, wherein event data objects associated with two or more browser tabs having a common origin are stored in a first object-oriented event management database of a plurality of object-oriented event management databases, wherein the first object-oriented event management database is associated with the common origin.

13. The method of claim 10, wherein the event data object is stored on the object-oriented event management database using the one or more event management execution threads.

14. The method of claim 10, wherein performing the stored event data object processing routine further comprises:

removing the stored event data object from the object-oriented event management database.

15. The method of claim 10, wherein the object-oriented event management database comprises one or more stored event data objects corresponding to one or more unprocessed browser events, wherein the one or more stored event data objects are retrieved in accordance with a retrieval scheduling policy associated with the object-oriented event management database.

16. The method of claim 10, wherein storing the event data object comprises:

identifying a service identifier associated with the browser event;

determining a namespace counter associated with the service identifier, wherein the namespace counter describes a count of a subset of one or more stored event data objects that are associated with the service identifier;

determining whether the namespace counter satisfies a namespace capacity threshold; and in response to determining that the namespace counter fails to satisfy the namespace capacity threshold:

removing, from the object-oriented event management database, an oldest stored event data object based at least in part on a timestamp associated with each stored event data object of the one or more stored event data objects.

17. The method of claim 10, wherein storing the event data object comprises:

identifying a service identifier associated with the browser event;

determining a namespace counter associated with the service identifier, wherein the namespace counter describes a count of a subset of one or more stored event data objects that are associated with the service identifier;

determining whether the namespace counter satisfies a namespace capacity threshold; and in response to determining that the namespace counter satisfies the namespace capacity threshold:

storing the event data object within the object-oriented event management database.

18. A computer program product for browser event management across a plurality of browser tabs, the computer program product comprising at least one non-transitory computer-readable storage medium having computer-readable program code portions stored therein, the computer-readable program code portions configured to:

create, on a client device, an object-oriented event management database associated with one or more browser tabs of the plurality of browser tabs, wherein each browser tab is configured for accessing one or more software applications, and wherein each software application of the one or more software applications is associated with an origin of a plurality of origins;

cause identifying of a browser event associated with a browser tab of the plurality of browser tabs;

cause storing of event data object corresponding to the browser event within the object-oriented event management database associated with an origin associated with the browser tab; and cause performing, using one or more event management execution threads that are executed asynchronously relative to a primary execution thread, a stored event data object processing routine configured to at least prevent duplicate transmission of event data corresponding to the stored event data object to a server computing device, wherein performing the stored event data object processing routine comprises retrieving the stored event data object from the object-oriented event management database for transmission to the server computing device in response to a processing time associated with the stored event data object satisfying a processing time threshold.

\* \* \* \* \*